Dec. 19, 1939. H. V. SHULER 2,183,779
BEET TOPPING MACHINE
Filed Oct. 2, 1937 5 Sheets-Sheet 1
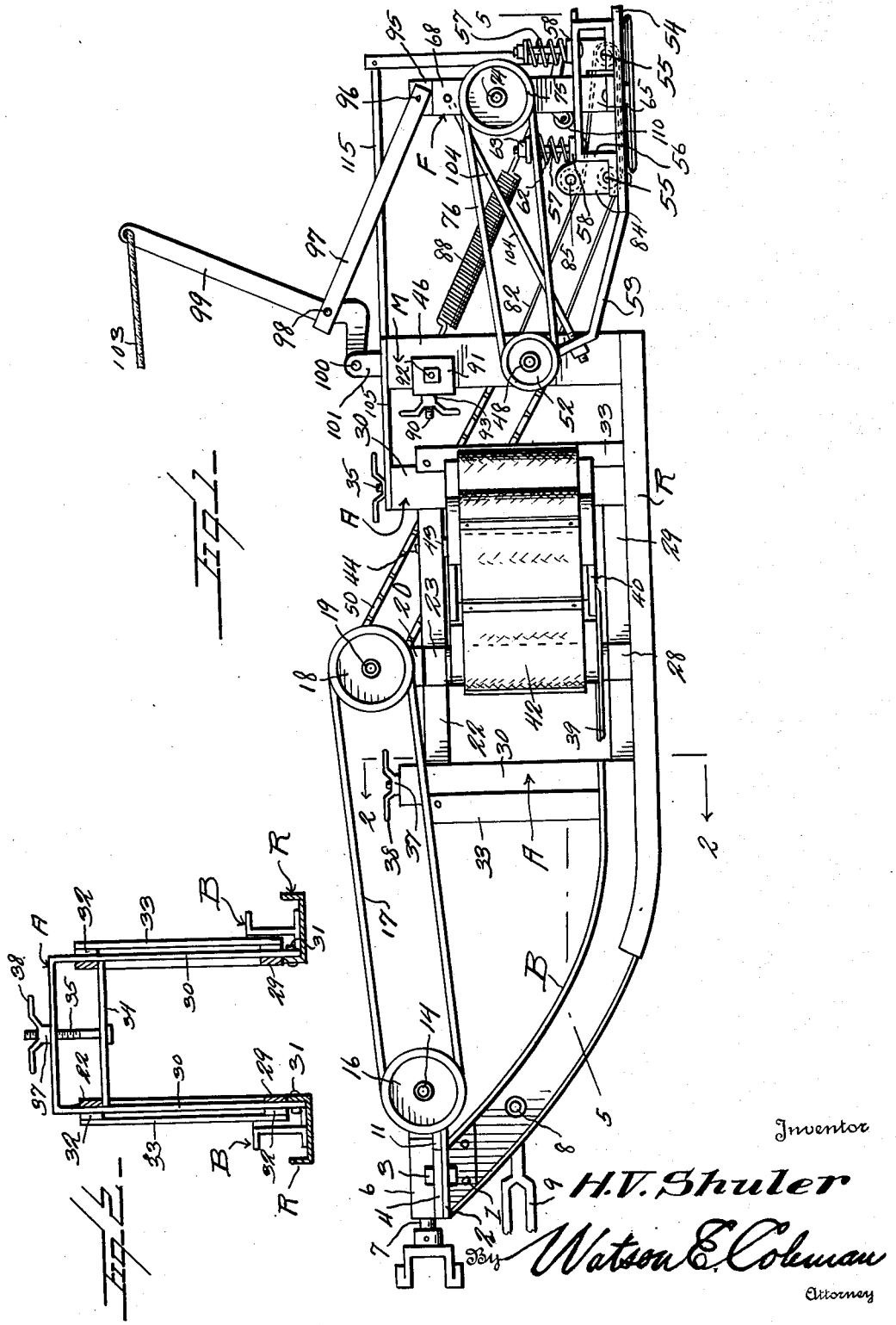
Inventor
H. V. Shuler
By Watson E. Coleman
Attorney Dec. 19, 1939.　　　H. V. SHULER　　　2,183,779
BEET TOPPING MACHINE
Filed Oct. 2, 1937　　　5 Sheets-Sheet 2
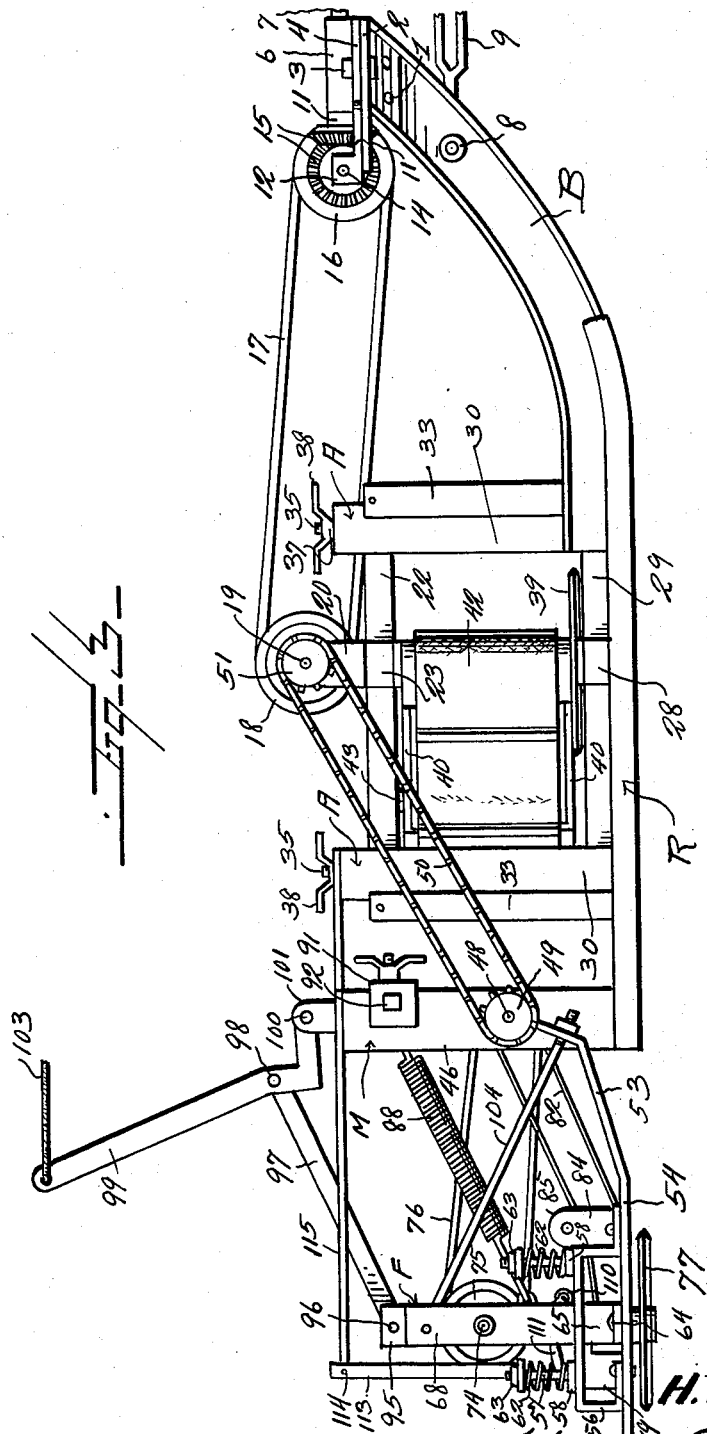
Inventor
H. V. Shuler
By Watson E. Coleman
Attorney Dec. 19, 1939.  H. V. SHULER  2,183,779
BEET TOPPING MACHINE
Filed Oct. 2, 1937   5 Sheets—Sheet 3
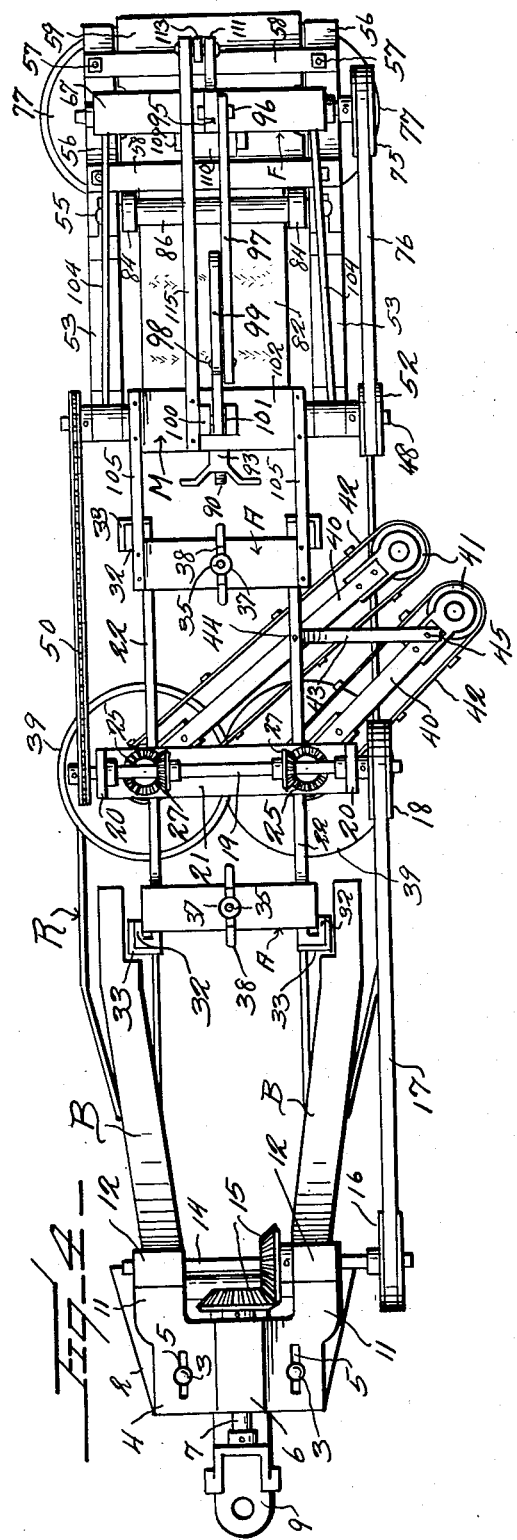
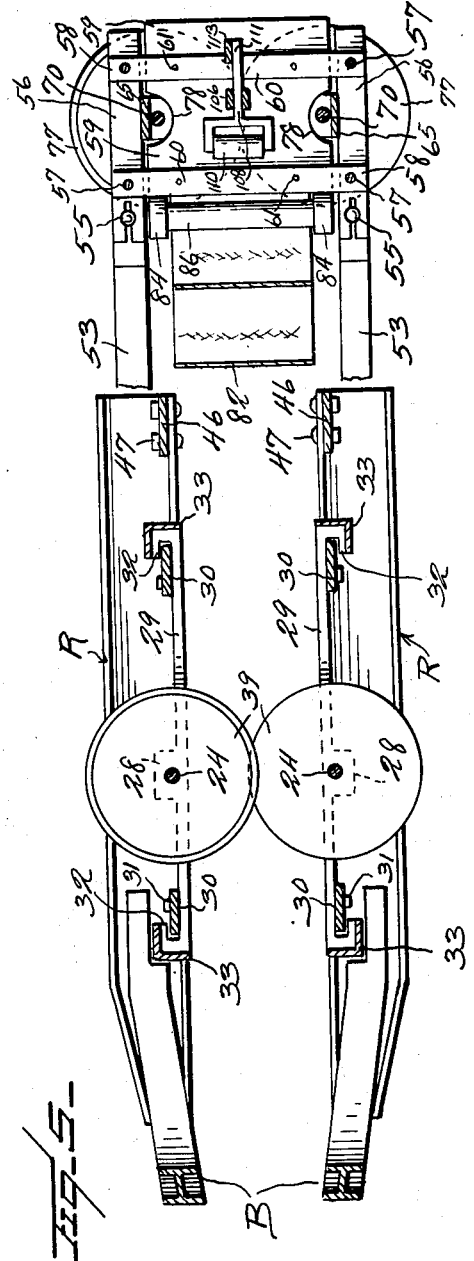
Inventor
H. V. Shuler
By Watson E. Coleman
Attorney

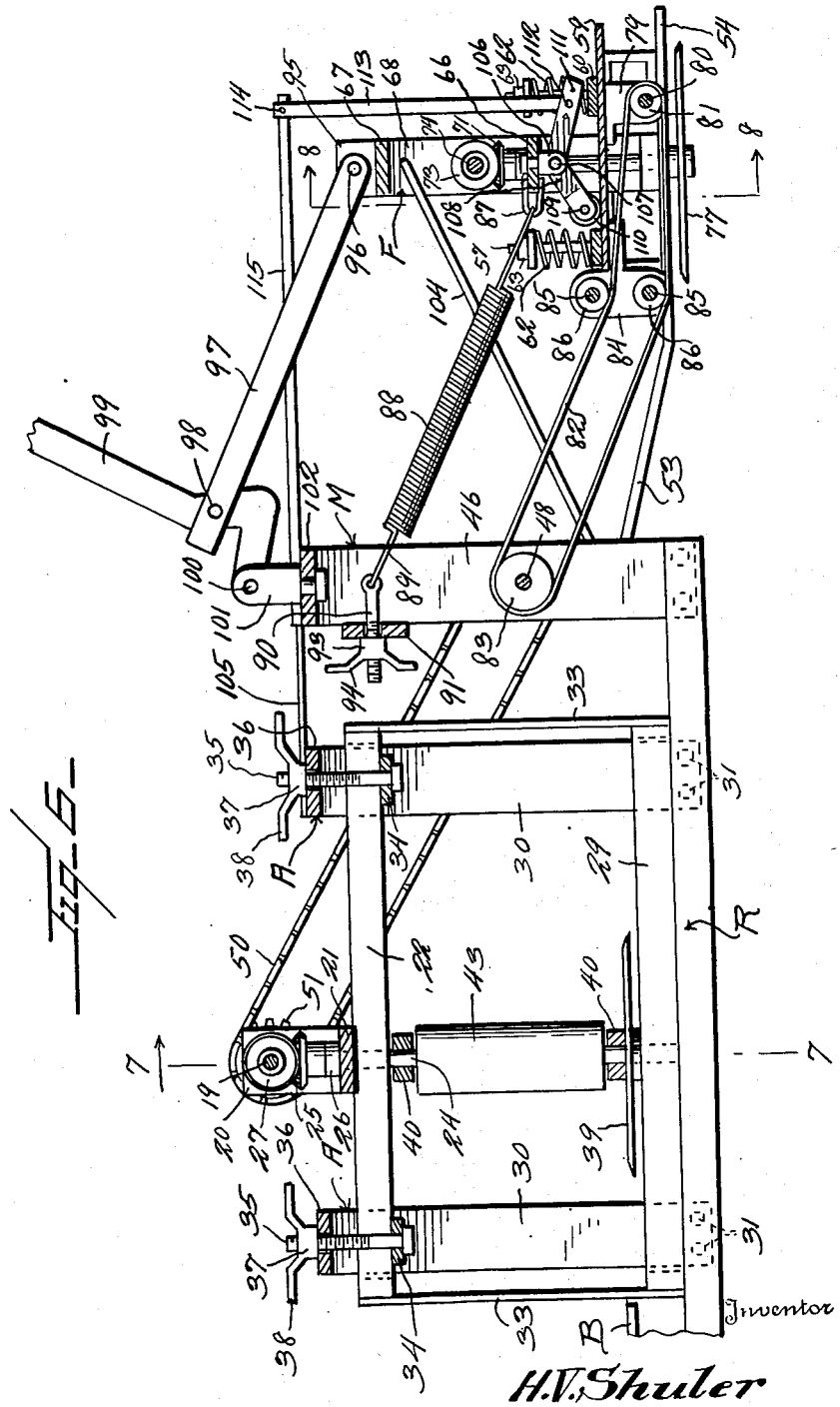

Dec. 19, 1939.    H. V. SHULER    2,183,779
BEET TOPPING MACHINE
Filed Oct. 2, 1937    5 Sheets—Sheet 5

Inventor
H. V. Shuler
By Watson E. Coleman
Attorney

Patented Dec. 19, 1939

2,183,779

UNITED STATES PATENT OFFICE 2,183,779

BEET TOPPING MACHINE

Harry V. Shuler, Ontario, Oreg., assignor of forty per cent to Frank Miller, Ontario, Oreg.

Application October 2, 1937, Serial No. 167,049

3 Claims. (Cl. 55—107)

This invention relates to a beet topping machine, and it is particularly an object of the invention to provide a machine of this kind adapted to be operated by and from a tractor.

It is also an object of the invention to provide a machine of this kind comprising two sets of cutting means, one of which operates to cut the foliage and the other to crown the beet.

Another object of the invention is to provide a machine of this kind including means for cutting off the foliage and discharging the severed foliage to one side of the plant row whereby no hinderance is offered to the subsequent crowning of the beet.

An additional object of the invention is to provide a machine of this kind comprising a crowning unit mounted in a manner to permit said unit as a whole to have swinging movement in a vertical direction to permit said unit to readily pass over the beets and also permitting said unit when desired to be raised into an ineffective position.

A still further object of the invention is to provide a machine of this kind including a crowning unit arranged for movement in a vertical direction including a crown cutting means together with a power driven endless belt positioned in advance of the cutting means, said belt being so constructed and arranged for coaction with a beet to automatically raise the unit for the desired crowning of the beet and whereby the crowning of the beets in a row will be substantially the same depth irrespective of the variations in the heights of the beets above the ground surface.

Still another object of the invention is to provide a machine of this kind including a crowning unit arranged for movement in a vertical direction as occasioned by the travel of the unit over the beets, together with means for controlling the extent of such upward movement when the crowning unit is in effective or working position.

The invention consists in the details of construction and in the combination and arrangement of the several parts of my improved beet topping machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in side elevation of a beet topping machine constructed in accordance with an embodiment of my invention;

Figure 2 is a transverse sectional view taken substantially on the line 2—2 of Figure 1 looking in the direction of the arrow with certain of the parts omitted;

Figure 3 is a view in elevation of the machine as herein disclosed looking at the side opposite from that illustrated in Figure 1;

Figure 4 is a view in top plan of the machine as illustrated in Figure 1;

Figure 5 is a detailed horizontal sectional view taken substantially on the line 5—5 of Figure 1;

Figure 6 is a vertical sectional view taken through the rear portion of the machine as herein disclosed and at substantially the transverse center thereof;

Figure 7:
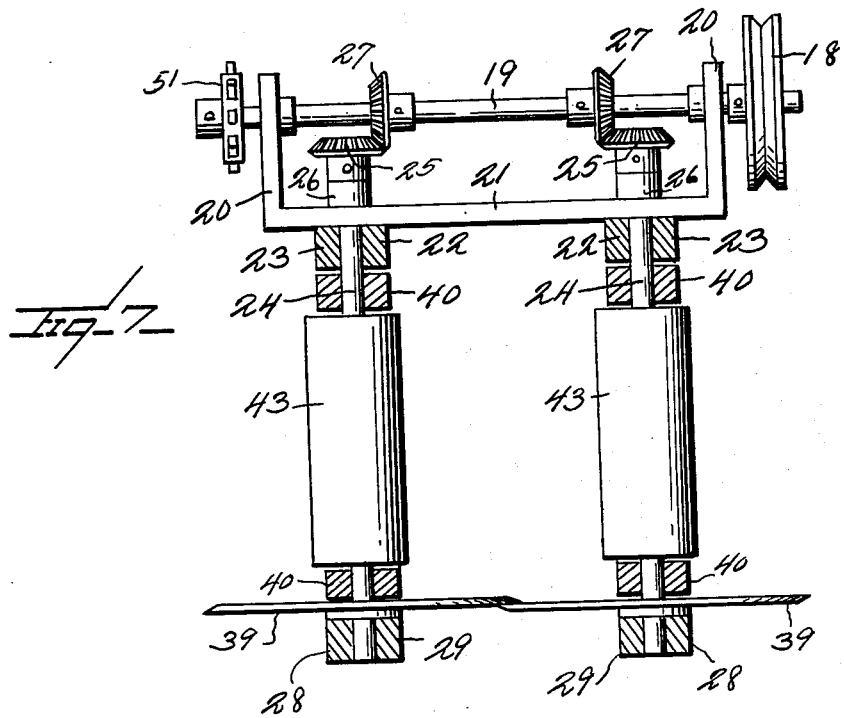
Figure 7 is a sectional view taken substantially on the line 7—7 of Figure 6.
Figure 8:
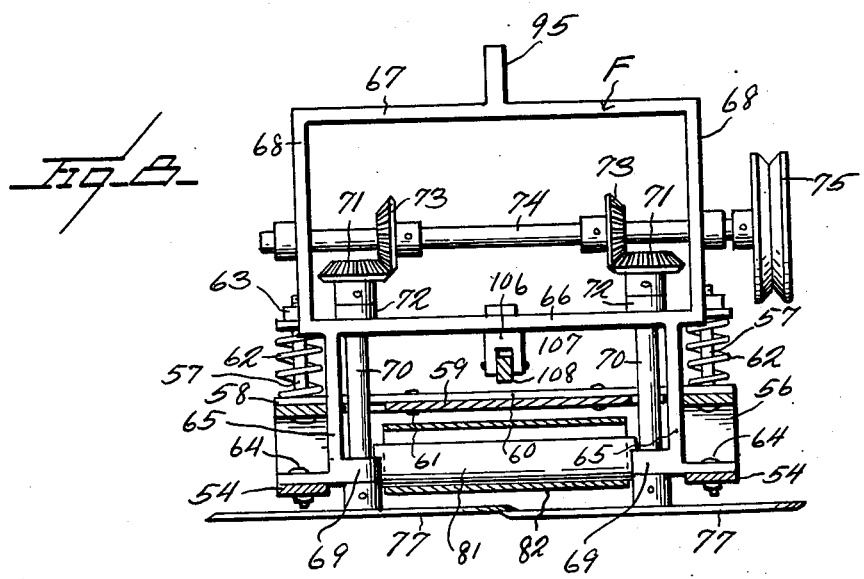
Figure 8 is a sectional view taken substantially on the line 8—8 of Figure 6 looking in the direction of the arrow.

As disclosed in the accompanying drawings, R denotes runners U-shaped in cross section and which have welded or otherwise firmly attached to their forward portions the lower extremities of the upwardly and outwardly curved I-beams B converging one toward the other. The upper or outer free end portions of these beams B have riveted or otherwise secured thereto, as at 1, the outwardly and laterally disposed brackets 2 to which is bolted, as at 3, or otherwise secured, the plate 4. As particularly illustrated in Figure 4, the plate 4 is provided with the slots 5 disposed in a direction lengthwise of the runners R through which the bolts 3 are directed. This provides means whereby, if desired, the plate 4 may be adjusted. The plate 4 substantially midway of the beams B carries a bearing 6 for a shaft 7. This shaft 7 is disposed in a direction lengthwise of the machine and the outer end portion thereof is adapted to be suitably coupled to the conventional power take-off shaft of a tractor with which my improved machine, as herein disclosed, is adapted to be employed.

The beams B at a desired point intermediate their ends have operatively connected therewith, as at 8, a hitch 9 of any desired type which is adapted to be connected as may be preferred with the tractor. It is, therefore, believed to be understood that my improved machine is adapted to be drawn along a plant row by a tractor and with the movable parts of my improved machine driven from the tractor.

The plate 4 is provided with transversely spaced and rearwardly disposed arms 11 carrying the bearings 12 for the transversely disposed shaft 14. This shaft 14 is in driven connection with the shaft 7 through the medium of the intermeshing gears 15. The shaft 14, as herein disclosed, has fixed thereon a pulley 16 engaged by an endless belt 17 which also engages a pulley 18 fixed to a shaft 19. This shaft 19 extends transversely of the machine and is rotatably supported by the upstanding bearings 20 carried by the extremities of the cross member 21. This cross member 21 rests from above upon the transversely spaced parallel top bars 22 of desired length and is welded or otherwise firmly attached thereto. The bars 22 immediately below the cross member 21 are outwardly enlarged, as at 23, to provide proper bearings for the vertically disposed shafts 24 which are rotatably disposed through said bearings 23 and the member 21. The upper end portions of the shafts 24 carry the beveled gears 25 and interposed between said gears 25 and the cross member 21 are the thrust washers or bearings 26 through which the shafts 24 are also directed. The gears 25 mesh with the pinions 27 fixed to the shaft 19, said pinions 27 and gears 25 being so assembled as to cause the shafts 24 to rotate in opposite directions.

The lower portions of the shafts 24 are rotatably engaged with the bearings 28 similar to the bearings 23 hereinbefore referred to, said bearings 28 being in vertical alignment with the bearings 23 and carried by the elongated parallel bottom bars 29.

The opposite end portions of the bars 22 and 29 extend across the inner faces of the side members 30 of the upstanding arches A suitably spaced apart in a direction lengthwise of the machine and positioned at desired points fore and aft of the cross member 21. These side members 30 of the arches are bolted, as at 31, with the inner side flanges of the runners R or otherwise effectively anchored to said runners. The extremities of the bars 22 and 29 are formed to provide inwardly facing hook members 32 in which are received the outer vertical marginal portions of the side members 30 of the arches A so that the bars 22 and 29 may be adjusted in a vertical direction along the side members 30 of the arches A. The bars 22 and 29 at each side are tied or connected at their ends by the rigid strips 33 which operate to maintain said bars 22 and 29 in desired spaced relation and assure the same having unitary movement up and down along the side members 30. These strips 33, as particularly illustrated in Figure 5, preferably comprise angle irons although, of course, I do not wish to be understood as limiting myself in this particular detail.

The upper bars 22 within an arch A are connected by a transversely disposed member 34 and disposed from below through the central portion of this member 34 is a headed shank 35. This shank 35 is of a length to extend through and above the central portion of the top or crown member 36 of the arch A and threading upon the upper or free end portion of the shank 35 is a nut 37 which contacts from above with the top or crown member 36 of the arch so that upon desired rotation of the nut 37 the bars 22 and 29 may be caused to raise or lower to a selected position as the occasions of use may prefer.

Each of the nuts 37, as herein disclosed, is provided with the oppositely disposed and radially extending operating members 38 to facilitate the manipulation of said nut 37.

Carried by and rotating with the lower portions of the shafts 24 and closely adjacent to the bottom bars 29 are the disk cutters 39 which operate as the machine traverses along a plant row to cut off the plant foliage as such foliage passes between the cutters 39.

Freely engaged with the upper and lower end portions of the shafts 24 are the bars 40 which extend laterally and rearwardly to one side of the machine, and rotatably supported by and between the outer or free end portions of these bars 40 are the vertically disposed rollers 41. Engaged with these rollers 41 are the endless belts 42 which also operatively engage the rollers or pulleys 43 mounted upon the shafts 24 between the bars 40 and rotating with the shafts 24. The shafts 24 rotate in a direction whereby the inner or opposed stretches of the belts 42 travel outwardly and rearwardly so that the foliage cut off by the disks 39 will be discharged to one side of the plant row whereby such cut foliage will offer no hinderance or obstruction to the desired functioning of the crowning unit now to be described.

The bars 40 are arranged in pairs with the bars of each pair in desired vertical spaced relation and co-acting with a single one of the shafts 24. As is particularly illustrated in Figure 4 of the drawings, these bars 40 and of course the belts 42 are maintained in desired position or relation with respect to the transverse center of the machine by a rigid member 43 herein disclosed as extending substantially at right angles to one of the bars 22 and secured to said bar and to the adjacent underlying portion of the inner upper bar 40 by a bolt 44 or otherwise as may be preferred. The outer end portion of this member 43 is bolted or otherwise securely attached, as at 45, to the outer extremity of the outer top bar 40.

Connecting the rear extremities of the runners R is an upstanding arch M each side member 46 of which is bolted or otherwise rigidly secured, as at 47, to an upstanding flange of a runner R and preferably the inner flange. These side members 46 at a point preferably below their vertical centers rotatably support a shaft 48. One extremity of the shaft 48 carries a sprocket wheel 49 which is operatively engaged by a sprocket chain 50 which also operatively engages a sprocket 51 carried by the end portion of the shaft 19 remote from the pulley 18. The opposite extremity of the shaft 48 carries a pulley 52 for a purpose to be hereinafter referred to.

Freely engaged with the shaft 48 outwardly of the side members 46 of the arch M are the forward extremities of the suitably formed rigid arms 53, the rear portion 54 of each of which is substantially straight. Bolted, as at 55, or otherwise securely fixed upon the straight portions 54 of the arms 53 are the frames 56 disposed in a direction lengthwise of the arms. The frames 56 adjacent to their opposite ends are provided with upstanding members 57 which are freely disposed through laterally outstanding lugs 58 or kindred parts carried by a plate or roller table 59. As herein disclosed, the lugs or parts 58 constitute extended portions of rigid members 60 riveted, as at 61, or otherwise securely attached to the top face of the plate or table 59. It is to be noted that this table 59 substantially bridges the space between the frames 56 and that its downward movement is limited by contact of the lugs 58 from above with the frames 56.

This plate or table 59 is constantly urged toward its lowermost position and maintained in such position by the expansible members 62 of desired tension, said members being herein disclosed as coil springs encircling the members 57 and interposed between the lugs 58 and the adjustable stops 63 threading upon the upper end portions of the members 57.

Riveted, as at 64, or otherwise securely fastened to the straight portions 54 of the arms 53 and substantially midway of the plate or table 59 are the vertically disposed posts 65 herein disclosed as having their upper end portions integrally formed with a transversely disposed frame F comprising a bottom member 66, a top member 67 and side members 68. The lower portions of the posts 65 carry inwardly directed bearings 69 for the lower portions of the vertically disposed shafts 70, the upper portions of which are rotatably disposed through the lower member 66 of the frame F and extending thereabove. Carried by the upper portions of the shafts 70 are the gears 71 and interposed between said gears 71 and the bottom member 66 of the frame F are the thrust washers or bearings 72. Meshing with the gears 71 are the gears 73 fixed for rotation upon the shaft 74. This shaft 74 is rotatably supported by the side members of the frame F and one end portion of this shaft 74 carries a pulley 75 whereby the shaft 74 is in driven engagement with the shaft 48 through the medium of the belt 76 which also engages the pulley 52 hereinbefore referred to on the shaft 48.

The shafts 70 also extend below the bearings 69 and fixed to the lower end portions of the shafts 70 are the cutting disks 77. As is clearly illustrated in the drawings, these disks 77 are positioned below the portions 54 of the arms 53 so that no hinderance or obstruction is offered to the rotation of such disks 77, thereby assuring an effective topping or cutting of the beets as the machine travels along the plant row.

It will be noted in Figure 5 of the drawings that the plate or table 59 has its marginal portions cut away, as at 78, to provide proper clearance for the shafts 70. The rear portion of the plate or table 59 is provided with transversely spaced depending bearings 79 which provide mountings for the shaft 80 carrying the roller 81. Operatively engaged with this roller 81 is an endless belt 82 which is also operatively engaged with a pulley 83 mounted upon the shaft 48 for rotation therewith and positioned between the side members 46 of the arch M. The forward portion of the plate or table 59 is also provided with transversely spaced bearings 84 which provide mountings for the vertically spaced shafts 85 carrying the rollers 86. The upper stretch of the belt 82 engages the upper roller 86 from below while the lower stretch of the belt 82 engags from below the lower roller 86. These rollers 86 constitute guides for the belt 82 so that the same may have proper positioning below the plate or table 59 and also to allow the forward portion of the lower stretch of said belt to extend upwardly and forwardly on an incline.

Secured, as at 87, to the central portion of the lower member 66 of the frame F is an end portion of a retractile spring 88 of desired tension, the opposite end portion of which is secured, as at 89, to the rear end portion of a shank 90 which is freely disposed through a cross member 91 bridging the space between and bolted or otherwise suitably secured, as at 92, to the side members 46 of the arch M. Threading upon the forward portion of the shank 90 is a nut 93 contacting with the cross member 91. By proper manipulation of the nut 93 the tension of the member 88 may be regulated. This nut 93 carries the oppositely disposed members 94 to facilitate its rotation.

The spring 88 is maintained at a tension to balance the crowning unit or to normally maintain the same in substantially a horizontal or level position as illustrated in the drawings, or in a position out of contact with the ground so that the crowning unit will at all times be in a position to assure the desired topping or crowning of the beets in a plant row.

The outwardly and forwardly inclined portion of the lower stretch of the belt 82 provides means whereby the crowning unit is automatically raised to compensate for high or low beets and thereby assuring the disks 77 cutting off the crown of a beet at the desired depth. It is also to be stated that the mounting of the plate or table 59 is such that the same can readily move upwardly against the tension of the springs 62 to assure the proper spacing between the disks 77 and the adjacent rear lower stretch of the belt 82 as may be required during the cutting operation of the disks 77.

The top member 67 of the frame F, as herein disclosed, is provided with an upstanding lug 95 with which is pivotally connected, as at 96, an end portion of a bar 97 which in turn is pivotally connected, as at 98, to the lower portion of an upstanding lever 99. This lever 99 is pivotally connected, as at 100, to an upstanding clevis 101 mounted upon the top member 102 of the arch M. The lever 99 has suitably secured to the upper portion thereof an extremity of a cable 103 or other flexible member which is preferably of a length to extend to the seat for the operator on the tractor to which the machine may be hitched so that when desired the operator may raise the crowning unit. The frame F has connected to the upper portion of each of its side members 68 the extremity of a brace rod 104 which is also suitably engaged with the forward portion of the arm 53.

I also find it of advantage to connect the top member 102 of the arch M with the top member 36 of the rear arch A at the extremities thereof by the bracing bars 105.

The upper stretch of the belt 82 through its contact from below with the upper roller 86 has a tendency to raise the plate or table 59 and it is, therefore, important to provide means to prevent this so that normally the lower stretch of the belt 82 will be maintained in proper position with respect to the disks 77.

Depending from the central portion of the lower member 66 of the frame F is a clevis 106 with which is pivotally connected, as at 107, the stem 108 of a fork 109. This fork 109 carries a roller 110 for contact from above with the plate or table 59.

The pivoted end portion of the stem 108 is continued by an angularly related arm 111 with which is operatively connected as at 112, the lower end portion of a vertically disposed rigid member or bar 113. The upper end portion of this member or bar 113 is pivotally connected, as at 114, with a rearwardly disposed elongated bar 115 extending from the top member 102 of the arch M. Normally the contact of the roller 109 with the plate or table 59 resists the strain imposed upon said plate or table 59 by the upper stretch of the belt 82 but as the crowning unit is caused to rise as a result of the contact of the lower stretch of the belt 82 with a beet, the bar 113 will hold the pivotal connection of the arm 111 against moving upwardly resulting in the raising of the roller 110 and thus permitting the plate or table 59 to rise as may be required to provide the necessary space between the disks 77 and the adjacent lower stretch of the belt 82.

When the cable 103 is pulled to raise the crowning unit the arm 111 at its connection 112 with the member or bar 113 remains fixed through the resistance offered by the bar or member 113. This will allow the stem 108 to swing upon its connection 112 as the crowning unit raises due to the contact of the plate or table 59 with the roller 110 carried by the stem 108. This upward movement of the crowning unit is limited by contact of the outer extremity of the arm 111 with the table or plate 59 or more particularly with a member 60. It is believed to be obvious that by varying the angular relation of the arm 111 with respect to the stem 108, the extent of raising of the crowning unit may be as desired. In other words, the amount of clearance between the outer extremity of the arm 111 and the plate or table 59 determines the extent to which the crowning unit may be lifted. The purpose of lifting the plate or table 59 is to move the lower stretch of the belt 82 away from the disks 77 to permit a gauging of the cut on the individual beet.

From the foregoing description it is thought to be obvious that a beet topping machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising a portable supporting structure, a rotary cutter carried thereby and rotating about a vertically disposed axis, a horizontally disposed plate carried by the structure and positioned above the rotary cutter, said plate being mounted for limited movement in a vertical direction, yieldable means resisting the upward movement of said plate, guide rollers carried by the plate and positioned fore and aft of the axis of the cutter, an endless belt extending between the plate and cutter and operatively engaging the guide rollers, said belt being disposed in the general direction of travel of the machine, said belt extending a material distance in advance of the plate, the stretches of the belt being vertically spaced, the lower stretch in advance of the plate being upwardly and forwardly directed, and means for operating the cutter and belt.

2. A machine of the class described comprising a portable supporting structure, a rotary cutter carried thereby and rotating about a vertically disposed axis, a horizontally disposed plate carried by the structure and positioned above the rotary cutter, said plate being mounted for limited movement in a vertical direction, yieldable means resisting the upward movement of said plate, guide rollers carried by the plate and positioned fore and aft of the axis of the cutter, an endless belt extending between the plate and cutter and operatively engaging the guide rollers, said belt being disposed in the general direction of travel of the machine, said belt extending a material distance in advance of the plate, the stretches of the belt being vertically spaced, the lower stretch in advance of the plate being upwardly and forwardly directed, means for operating the cutter and belt, and means coacting with the plate to prevent upward movement of the plate by action of the belt.

3. A machine of the class described comprising a portable supporting structure, a rotary cutter carried thereby and rotating about a vertically disposed axis, a horizontally disposed plate carried by the structure and positioned above the rotary cutter, said plate being mounted for limited movement in a vertical direction, yieldable means resisting the upward movement of said plate, guide rollers carried by the plate and positioned fore and aft of the axis of the cutter, an endless belt extending between the plate and cutter and operatively engaging the guide rollers, said belt being disposed in the general direction of travel of the machine, said belt extending a material distance in advance of the plate, the stretches of the belt being vertically spaced, the lower stretch in advance of the plate being upwardly and forwardly directed, means for operating the cutter and belt, means coacting with the plate to prevent upward movement of the plate by action of the belt, and means making said last named means ineffective to allow upward movement of the plate upon raising of the supporting structure.

HARRY V. SHULER.